April 9, 1940.  H. A. HUSTED  2,196,731
METHOD OF FORMING AUTOMOBILE STEERING WHEEL HUBS
Filed Aug. 20, 1937
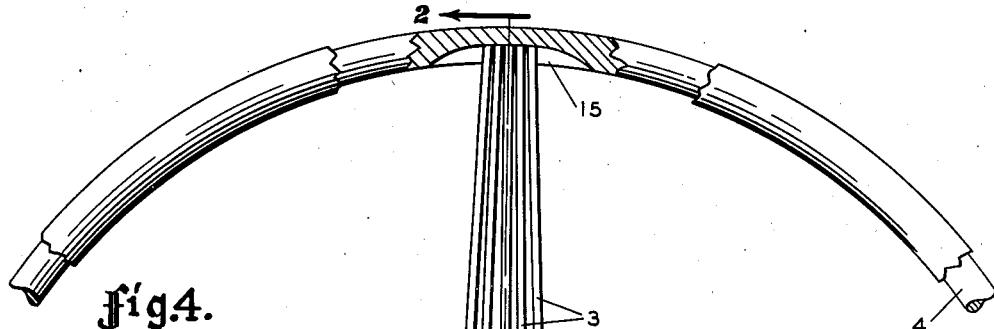
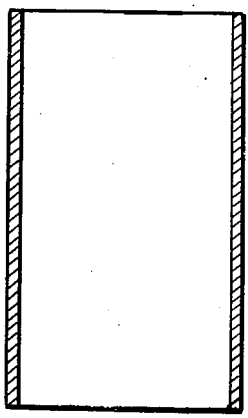
Fig.4.
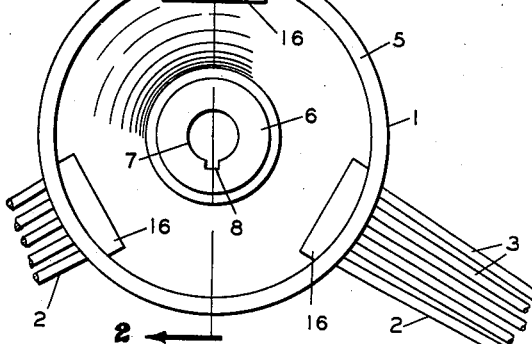
Fig. 1
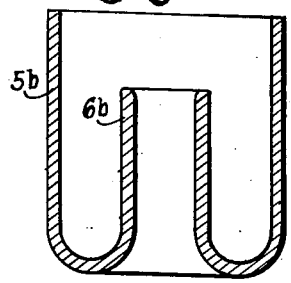
Fig.5.
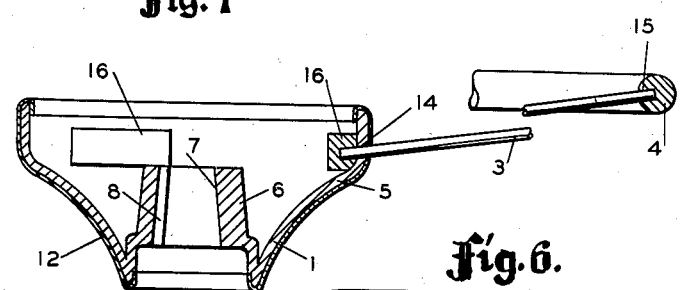
Fig. 2
Fig.6.
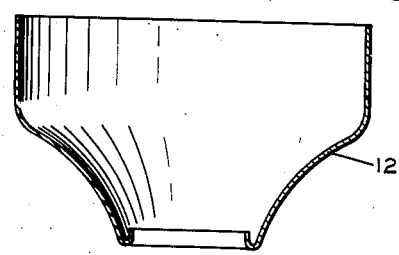
Fig. 3
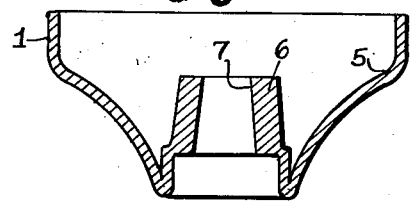
INVENTOR.
HARRY A. HUSTED
BY John H. Leonard,
HIS ATTORNEY.

Patented Apr. 9, 1940

2,196,731

UNITED STATES PATENT OFFICE 2,196,731

METHOD OF FORMING AUTOMOBILE STEERING WHEEL HUBS

Harry A. Husted, St. Clair, Mich., assignor, by mesne assignments, to The Standard Products Company, Port Clinton, Ohio, a corporation of Ohio Application August 20, 1937, Serial No. 160,127

2 Claims. (Cl. 29—159.3)

This invention relates in general to an improvement in the manufacture of automobile steering wheels and more specifically to the hub construction thereof. The preferred embodiment of the invention discloses a steering wheel hub which is formed from a length of steel tubing.

Prior sheet metal hubs have been built up from a plurality of cooperating stampings which were fitted and welded together as a unit. In such a built-up hub, the central portion thereof contained a bushing or a sleeve which was welded to certain of the sheet metal stampings during the assembling operation. This bushing was necessarily made of heavier stock than the stock employed for the sheet metal stampings in order to provide a keyway for accommodating a locking key between the hub and the steering column, and also to provide the necessary reinforcement for transmitting the torque exerted upon the steering wheel rim to the steering column.

The cost of such a built-up hub is considerable due to the fact that several expensive manufacturing operations are necessary. For example, the several stampings require separate forming dies and each at least one forming operation. Some of these stampings are complicated, due to the interfitting portions, and, accordingly, the number of operations and the number of forming dies required is correspondingly increased. Obviously, these dies and operations add greatly to the cost of manufacture of such a hub.

The welding operation also adds to the cost of manufacture of these built-up hubs. This is apparent from the fact that each of the several stampings must be placed and held in the proper relative position during the welding operation. Furthermore, the cost of the welding machines and the power consumed thereby materially increases the unit cost of each hub.

Another serious objection to such a built-up hub lies in the strength of the assembly. The force transmitted from the rim to the steering column depends entirely upon the strength of the weld between the several stampings. Thus the load is carried by a few distributed points of connection rather than being distributed evenly over the entire hub member.

Again, it is difficult and expensive to inspect each individual hub assembly as to rigidity. The welded spots may appear from the surface to be capable of carrying the required load and yet fail when subjected to a physical test.

Prior steering wheel hubs have also been made of a single cast or forged member. Such a hub, however, is considerably heavier in weight than a sheet metal hub by reason of the greater thickness of metal required compared to the thickness of the sheet metal. Cast hubs, therefore, are more expensive because of the increase in cost of shipping.

These and other objections to prior hubs have been entirely eliminated by the present one-piece sheet metal hub.

An important object, therefore, of the present invention lies in the provision of a uniformly rigid unitary sheet metal hub for an automobile steering wheel.

A correlative object is to provide such a hub which can be manufactured at a relatively low cost and which is stronger, for a given weight, than similar hubs made from a plurality of stampings or from a single casting or forging.

Other objects will be apparent from a consideration of the specification and accompanying drawing.

In the drawing:

Fig. 1 is a fragmentary plan view of a steering wheel embodying the present invention;

Fig. 2 is a fragmentary sectional view through the hub and rim members taken substantially along the line 2—2 of Fig. 1;

Fig. 3 is a sectional view of the stainless steel cover for the hub member;

Figs. 4, 5 and 6 are sectional views showing the operating steps necessary in the formation of a hub from a section of steel tubing.

The hub member 1, illustrated in Fig. 1, comprises a generally bell-shaped portion 5 to which the spoke members 3 are attached and from which the said spoke members radiate. A central portion 6, having a tapered opening 7, surrounds the corresponding tapered portion of a steering column, not shown. This portion 6 is provided with a keyway 8 which receives a key for locking the hub member to the steering column against relative rotation therebetween.

It will be noted that the central portion 6 is greater in thickness than the remaining bell-shaped portion 5. This central portion is made heavier in order to accommodate the keyway 8 and to carry the necessary torsional and thrust loads from the rim to the steering column.

The hub section is produced by using a blank of metal tubing substantially as shown in Fig. 4. The first operation on this blank is to turn one end portion $6^b$ of the tubing inwardly so that it extends in a direction substantially parallel to but spaced from the remaining portion $5^b$. This inwardly turned portion $6^b$ becomes the central portion 6 and the outer portion 5ᵇ becomes the portion 5 in the finished hub.

It will be noted in the first operation, shown in Fig. 5, that the central portion 6ᵇ has been increased somewhat in thickness by reason of the radial compression on the walls of the tubing during the forming operation. The section in Fig. 5 is then subjected to a further stamping operation which results in the formation of the completed hub section shown in Fig. 6, the portion 5ᵇ being flared outwardly to the shape of portion 5 and the portion 6ᵇ being subjected to the stock gathering operation to produce the desired thickness of the portion 6.

After the hub section has thus been formed, the keyway 8 is machined in the surface of the opening 7. It will be noted in Fig. 1 that there is adequate stock thickness between the inner and outer walls of the central portion 6 to accommodate the size of the keyway 8.

This resulting one-piece sheet metal hub section is much stronger for its weight than either a built-up hub or a cast or forged hub. The torsional and thrust loads are uniformly distributed over the entire section rather than being concentrated in a few spots as in the case of a built-up hub section. Furthermore, the cost of the one-piece hub is much less than the assembled type because it greatly reduces the cost of handling, decreases the number of forming operations required, and eliminates the expensive welding operation.

The hub member 1 may be enclosed in a thin shell 12 of stainless steel, the cross section of which is shown in Fig. 3. This shell is accurately stamped into the desired size and shape to fit the outer contour of the hub and is shown in assembled position on the hub in Fig. 2. The shell provides the desired high finish to the outer surface of the hub and is capable of retaining this high finish over long periods of time without corroding.

The next operation is to mount the spoke members 3 onto the hub and rim. This is preferably accomplished by drilling a plurality of substantially radial openings 14, the size of the spoke members, through the wall of the shell 12 and the bell-shaped portion 5 and also machining slots 15 on the inner periphery of the rim of a width equivalent to the diameter of the spoke members 3, as best shown in Fig. 2.

A plurality of these spoke members 3 are then welded at one end to an anchor block 16 to provide the composite spoke 2. These spoke members 3 are then passed through the openings 14 from the inside of the hub so that the block 16 lies in the position substantially as shown in Fig. 2, and the outer end of each spoke member 3 extends radially from the hub and lies in its associated slot 15 in the rim 4. In this position, the blocks 16 are securely welded to the inside of the hub and the outer ends of the spoke members 3 are permanently welded to the rim member 4.

If the usual transverse ornamental tie member is to be used, it is mounted on the spoke members after the outer ends thereof have been passed through the openings 14 and before they have been joined to the rim member 4.

From the above description, it will be seen that a novel one-piece sheet metal hub has been provided which is considerably lighter in weight than prior hubs and much stronger than either cast or built-up sheet metal hubs.

Having thus described my invention, I claim:

1. The method of forming a unitary automobile steering wheel hub having a spoke-supporting structure integral therewith from a single piece of sheet metal tubing comprising first turning one end of tubing inwardly and axially to provide an elongated central tubular hub portion with an outer surrounding portion radially spaced therefrom, upsetting the said elongated tubular hub portion to increase its thickness by decreasing its length while maintaining it in radially inwardly spaced relation from the said surrounding portion and while concurrently forming integral therewith the surrounding portion into a substantially bell-shaped spoke-supporting structure.

2. The method of manufacturing a one-piece hub for an automobile steering wheel from a sheet metal tubular blank having a central axis and a pair of oppositely disposed end portions, comprising turning one end portion of the tubular blank radially inwardly and thence axially toward the other end portion so as to produce a coaxial tubular portion of smaller diameter than the original diameter of the tubular blank, compressing said one end portion axially to increase the thickness of the wall of said portion while maintaining it in radially inwardly spaced relation from the said surrounding portion and concurrently flaring the other end portion radially outwardly to the desired bell-shaped section.

HARRY A. HUSTED.